United States Patent
Ashizawa

(10) Patent No.: US 8,035,276 B2
(45) Date of Patent: Oct. 11, 2011

(54) VIBRATION ACTUATOR, LENS BARREL AND CAMERA

(75) Inventor: Takatoshi Ashizawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/320,817

(22) Filed: Feb. 5, 2009

(65) Prior Publication Data
US 2009/0212662 A1   Aug. 27, 2009

(30) Foreign Application Priority Data
Feb. 8, 2008 (JP) ................................ 2008-029591

(51) Int. Cl.
*H01L 41/08* (2006.01)
(52) U.S. Cl. .............................. 310/323.04; 310/323.03
(58) Field of Classification Search . 310/323.03–323.09
See application file for complete search history.

(56) References Cited

U.S. PATENT DOCUMENTS

| | | | | |
|---|---|---|---|---|
| 4,484,099 A | * | 11/1984 | Kawai et al. | 310/317 |
| 4,678,956 A | * | 7/1987 | Izukawa et al. | 310/323.06 |
| 4,788,468 A | * | 11/1988 | Izukawa et al. | 310/323.06 |
| 4,829,209 A | * | 5/1989 | Kawasaki et al. | 310/323.06 |
| 5,172,023 A | * | 12/1992 | Kawai et al. | 310/323.04 |
| 5,256,928 A | * | 10/1993 | Nishikura et al. | 310/323.11 |
| 5,554,906 A | * | 9/1996 | Takagi | 310/323.04 |
| 6,628,046 B2 | * | 9/2003 | Seki | 310/323.04 |

FOREIGN PATENT DOCUMENTS

JP   A-3-273874   12/1991

* cited by examiner

*Primary Examiner* — Mark Budd
(74) *Attorney, Agent, or Firm* — Oliff & Berridge, PLC

(57) ABSTRACT

A vibration actuator with good driving performance, and a lens barrel and camera equipped therewith, is provided. There is provided a vibration actuator comprising: an electromechanical conversion element that is excited by a driving signal; a vibrating body including a joining face, to which the electromechanical conversion element is joined, and a driving face, at which a vibration wave is produced by the excitation; and a relative motion member that is pressingly touched against the driving face, is driven by the vibration wave, and relatively moves with respect to the vibrating body, wherein at a first and a second portion of the electromechanical conversion element in a direction parallel to the joining face and orthogonal to a direction of the relative movement of the vibrating body and the relative motion member, thickness in a direction orthogonal to the joining face differs between the first portion and the second portion.

8 Claims, 7 Drawing Sheets

VIBRATION ACTUATOR, LENS BARREL AND CAMERA

The present application claims priority under 35 U.S.C. §119 to Japanese Patent Application No. 2008-029591 filed on Feb. 8, 2008. The content of the application is incorporated herein by reference in its entirety.

BACKGROUND OF THE INVENTION

1. Field of the Invention

The present invention relates to a vibration actuator and to a lens barrel and camera equipped therewith.

2. Description of the Related Art

Heretofore, vibration actuators have been known in which expansion and contraction of an electromechanical conversion element is used to generate progressive vibration waves (hereinafter referred to as progressive waves) at a driving surface of a vibrating body, elliptical movements are produced at the driving surface by the progressive waves, and a relative motion member that pressingly touches against wave peaks of the elliptical movements is driven.

In recent years, reductions in size of these vibration actuators have been demanded. Among vibration wave actuators with configurations in which the resilient member has a substantially annular form and the relative motion member is rotatingly driven or the like, actuators with larger diametric direction widths produce greater driving force. When these vibration actuators are reduced in size, it is necessary to increase the diametric direction width of the resilient member in order to obtain driving force. Therefore, as the resilient member is reduced in size, there is a tendency for a ratio between the external diameter and the internal diameter of the resilient member to increase.

When the ratio between the external diameter and internal diameter of the resilient member increases, a difference between vibration amplitudes of the progressive waves at the outer periphery of the driving surface and vibration amplitudes of the progressive waves at the inner periphery becomes larger. Consequently, a problem arises in that driving of the relative motion member becomes unstable, losses of vibration occur, and driving efficiency of a vibration wave motor falls.

As a measure to reduce the difference between the vibration amplitudes of progressive waves at the outer periphery and the vibration amplitudes at the inner periphery, Patent Reference 1 discloses a technique of forming indentation portions (grooves) in the face of the relative motion member that touches against the vibrating body (a driving surface). The indentation portions do not reach as far as the outer periphery end of the vibrating body. Thus, thickness at the outer periphery of the vibrating body and thickness at the inner periphery are altered, and stiffnesses thereof with respect to bending displacements are altered (for example, see Japanese Unexamined Patent Publication No. H3-273874).

SUMMARY OF THE INVENTION

However, with the technique disclosed in Patent Reference 1, the thickness of a base portion of the vibrating body at the outer periphery is increased and stiffness with respect to bending displacements is larger. In this state, vibration characteristics differ between the inner periphery side and the outer periphery side. Consequently, there is a problem in that sufficient vibration amplitudes are not obtained and driving force is reduced.

An object of the present invention is to provide a vibration actuator with good driving performance, and a lens barrel and camera equipped therewith.

In order to achieve the object mentioned above, according to a first aspect of the present invention, there is provided a vibration actuator comprising: an electromechanical conversion element that is excited by a driving signal; a vibrating body including a joining face, to which the electromechanical conversion element is joined, and a driving face, at which a vibration wave is produced by the excitation; and a relative motion member that is pressingly touched against the driving face, is driven by the vibration wave, and relatively moves with respect to the vibrating body, wherein at a first portion and a second portion of the electromechanical conversion element in a direction that is parallel to the joining face and orthogonal to a direction of the relative movement of the vibrating body and the relative motion member, thickness in a direction orthogonal to the joining face differs between the first portion and the second portion.

The electromechanical conversion element and the vibrating body may be in substantially annular forms, the first portion may be an inner periphery portion of the electromechanical conversion element, and the second portion may be an outer periphery portion of the electromechanical conversion element.

The thickness of the inner periphery portion in the direction orthogonal to the joining face may be thinner than the thickness of the outer periphery portion in the direction orthogonal to the joining face.

The thickness of the electromechanical conversion element in the direction orthogonal to the joining face may alter stepwise along the direction that is parallel to the joining face and orthogonal to the direction of relative movement of the vibrating body and the relative motion member.

The thickness of the electromechanical conversion element in the direction orthogonal to the joining face may alter stepwise along the direction that is parallel to the joining face and orthogonal to the direction of relative movement of the vibrating body and the relative motion member, due to the electromechanical conversion element being formed with a plurality of layers being stacked.

According to a second aspect of the present invention, there is provided a vibration actuator comprising: an electromechanical conversion element that is excited by a driving signal; a vibrating body including a joining face, to which the electromechanical conversion element is joined, and a driving face, at which a vibration wave is produced by the excitation; a relative motion member that is pressingly touched against the driving face, is driven by the vibration wave, and relatively moves with respect to the vibrating body; and an output portion that supplies the driving signal to the electromechanical conversion element, wherein at a first portion and a second portion of the electromechanical conversion element in a direction that is parallel to the joining face and orthogonal to a direction of the relative movement of the vibrating body and the relative motion member, a piezoelectric strain amount produced by the driving signal at the first portion differs from a piezoelectric strain amount produced by the driving signal at the second portion.

The electromechanical conversion element and the vibrating body may be in substantially annular forms, the first portion is an inner periphery portion of the electromechanical conversion element, and the second portion is an outer periphery portion of the electromechanical conversion element.

The piezoelectric strain amount produced at the inner periphery portion may be larger than the piezoelectric strain amount produced at the outer periphery portion.

A piezoelectric constant of a material that forms the first portion may differ from a piezoelectric constant of a material that forms the second portion.

A magnitude of an electric field produced at the first portion by the driving signal may differ from a magnitude of an electric field produced at the second portion by the driving signal.

In order to achieve the object mentioned above, according to a third aspect of the present invention, there is provided a lens barrel according to the above aspects of the vibration actuator.

In order to achieve the object mentioned above, according to a forth aspect of the present invention, a camera comprising the vibration actuator according to the above aspects of the vibration actuator.

The present invention may not be limited to the above description. The component of the embodiment described later may be modified as appropriate, and any other component may be substituted for at least a part of them. Further, constituent without any special limitation of its arrangement is not limited to arrangement disclosed in embodiments and may be arranged to the position where the function can be completed According to the present invention, a vibration actuator with good driving performance, and a lens barrel and camera equipped therewith, can be provided.

DETAILED DESCRIPTION OF THE INVENTION

Herebelow, preferred embodiments of the present invention are described with reference to the attached drawings and suchlike. The following embodiments describe an ultrasonic motor, which is offered as an example of the vibration actuator.

First Embodiment

Figure 1:
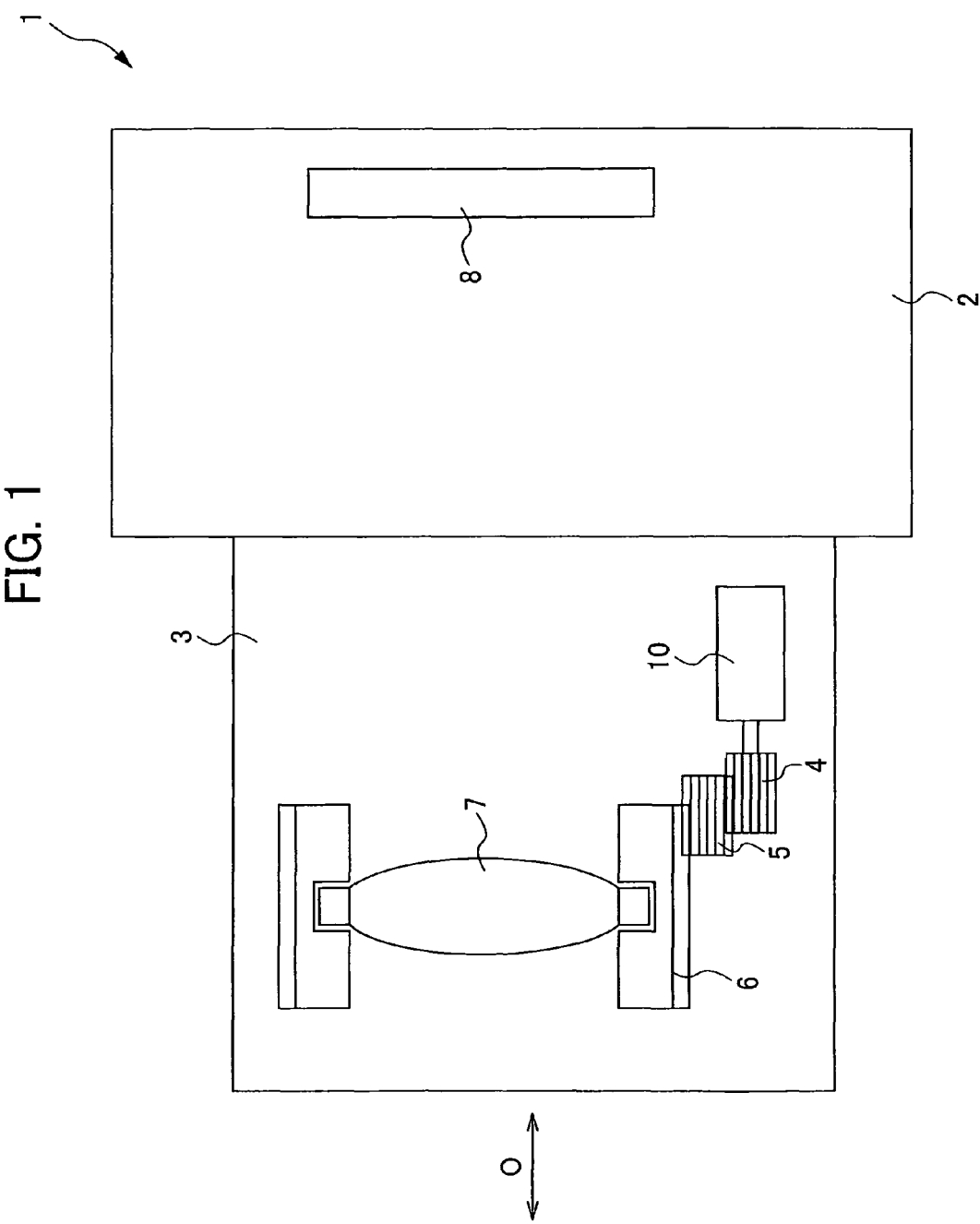
FIG. 1 is a view describing a camera of a first embodiment.

FIG. 1 is a view describing the camera 1 of the first embodiment.

The first embodiment of the camera 1 is provided with a camera body 2 including an imaging device and a lens barrel 3 including a lens 7.

The lens barrel 3 is an interchangeable lens which is detachable from the camera body 2. In the present embodiment, the lens barrel 3 illustrates an example that is an interchangeable lens, but this is not to be limiting; for example, it may be a lens barrel that is integral with the camera body.

The lens barrel 3 is provided with the lens 7, a cam tube 6, gears 4 and 5, the ultrasonic motor 10 and so forth. In the present embodiment, the ultrasonic motor 10 is used as a drive source that drives the lens 7 when focus-driving the camera 1.

The driving force provided from the ultrasonic motor 10 is transmitted to the cam tube 6 via the gears 4 and 5. The lens 7 is retained in the cam tube 6. The lens 7 is a focusing lens that is moved in a direction substantially parallel to an optical axis direction (the direction of arrow O shown in FIG. 1) by the driving force of the ultrasonic motor 10 and implements focus point adjustment.

In FIG. 1, an image of a object is focused at an imaging plane of an imaging element 8 by an unillustrated lens group (including the lens 7) which is provided inside the lens barrel 3. The object image imaged by the imaging element 8 is converted to electronic signals and these signals are A/D-converted. Thus, image data is obtained.

Figure 2:
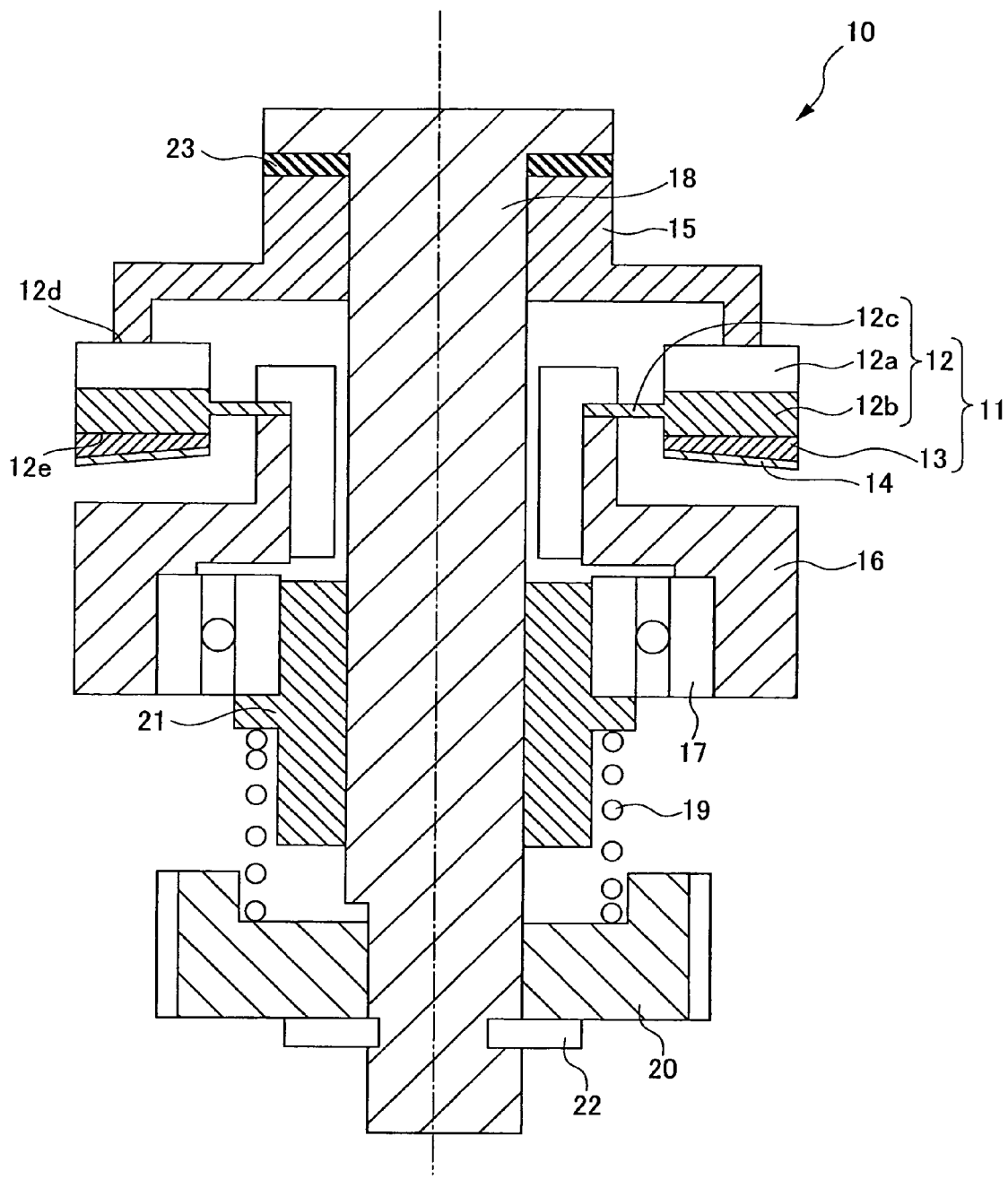
FIG. 2 is a cross-sectional view of an ultrasonic motor of the first embodiment.

FIG. 2 is a cross-sectional view of the ultrasonic motor 10 of the first embodiment.

The ultrasonic motor 10 of the first embodiment is provided with an vibrator 11, a moving element 15, an output shaft 18, a pressing member 19 and so forth. The ultrasonic motor 10 is fixed at the vibrator 11 side thereof, and has a form in which the moving element 15 is rotatingly driven.

The vibrator 11 is a member with a substantially annular shape, which includes a vibrating body 12 and the piezoelectric body 13, which is joined to the vibrating body 12.

The vibrating body 12 is formed of a metallic material with a large resonance peak sharpness, and the shape thereof is substantially annular. This vibrating body 12 includes a combtooth portion 12a, a base portion 12b and a flange portion 12c.

At the combtooth portion 12a, a plural number of grooves are formed by cutting into a face at a side thereof that is opposite from a face at which the piezoelectric body 13 is joined. Distal end faces of the combtooth portion 12a pressingly touch against the moving element 15, and form a driving face 12d that drives the moving element 15. A lubricating surface treatment is applied to this driving face, such as Ni—P (nickel-phosphorus) plating or the like. The reason for providing the combtooth portion 12a is to bring a neutral plane of progressive vibration waves, which are produced at the driving face 12d by expansion and contraction of the piezoelectric body 13, as close as possible to the piezoelectric body 13 side, thus amplifying the amplitudes of the progressive waves at the driving face 12d.

The base portion 12b is a portion that is continuous in the circumferential direction of the vibrating body 12. The piezoelectric body 13 is joined to a face (a joining face 12e) of the base portion 12b at the opposite side thereof from the combtooth portion 12a.

The flange portion 12c is a brim-form portion protruding inward in the diametric direction of the vibrating body 12, and is disposed centrally in the thickness direction of the base portion 12b. The vibrator 11 is fixed to a fixing member 16 by this flange portion 12c.

The piezoelectric body 13 is an electromechanical conversion element that converts electrical energy to mechanical energy. In the present embodiment, a piezoelectric element is used as the piezoelectric body 13, but an electrostriction element or the like could be used. The piezoelectric body 13 is divided, along the circumferential direction of the vibrating body 12, into ranges into which driving signals of two phases (an A phase and a B phase) are inputted (see FIG. 4B). In each phase, elements (electrode portions D2 to D5 and D6 to D9, which will be described later) are arranged, and polarizations thereof are alternatively with difference of ½-wavelength. A ¼-wavelength gap is provided between the A phase and the B phase. The piezoelectric body 13 is joined to the vibrating body 12, using an adhesive or the like. Details of the piezoelectric body 13 will be described later.

Wiring of a flexible printed circuit board 14 is connected to the electrodes of the respective phases at the piezoelectric body 13. Driving signals are supplied to the flexible printed circuit board 14 from amplification sections 104 and 105, which will be described later (see FIG. 3), and the piezoelectric body 13 expands and contracts in accordance with the driving signals.

In the vibrator 11, the progressive waves are generated at the driving face of the vibrating body 12 by the expansion and contraction of the piezoelectric body 13. In the present embodiment, four progressive waves are generated.

The moving element 15 is formed of a light metal such as aluminum or the like, and is a member which is rotatingly driven by the progressive waves produced at the driving face 12d of the vibrating body 12. The surface of the face of the moving element 15 that touches against the vibrator 11 (the driving face 12d of the vibrating body 12) is subjected to a surface treatment such as anodization or the like in order to improve abrasion resistance.

The output shaft 18 is a substantially cylindrical member. The output shaft 18 is provided with the first end portion touching against the moving element 15, via a rubber member 23, so as to rotate integrally with the moving element 15.

The rubber member 23 is a substantially cylindrical member formed of rubber. This rubber member 23 has the function of making the moving element 15 and the output shaft 18 integrally rotatable, with viscoelasticity due to the rubber, and the function of absorbing vibrations, such that vibrations are not transmitted from the moving element 15 to the output shaft 18, and butyl rubber, silicon rubber, propylene rubber or the like is used.

The pressing member 19 is a member which generates a pressure force that pressingly touches the vibrator 11 and the moving element 15 together, and is provided between a gear member 20 and a bearing holding member 21. In the present embodiment, the pressing member 19 employs a compression coil spring, but this is not a limitation.

The gear member 20 is slid on so as to fit onto a D-cut of the output shaft 18, is fixed by a stopper 22 such as an E-ring or the like, and is provided so as to be integral with the output shaft 18 in the rotation direction and the axial direction. The gear member 20 transmits driving force to the gear 4 (see FIG. 1) by rotating along with rotation of the output shaft 18.

A structure is formed in which the bearing holding member 21 is disposed at the inner diametric side of a bearing 17 and the bearing 17 is disposed at the inner diametric side of the fixing member 16.

The pressing member 19 presses the vibrator 11 toward the moving element 15 in the axial direction of the output shaft 18. The moving element 15 is pressingly touched against the driving face of the vibrator 11 by this pressing force, and is rotatingly driven. A pressure regulation washer may be provided between the pressing member 19 and the bearing holding member 21, such that a suitable pressure force for driving of the ultrasonic motor 10 is obtained.

Figure 3:
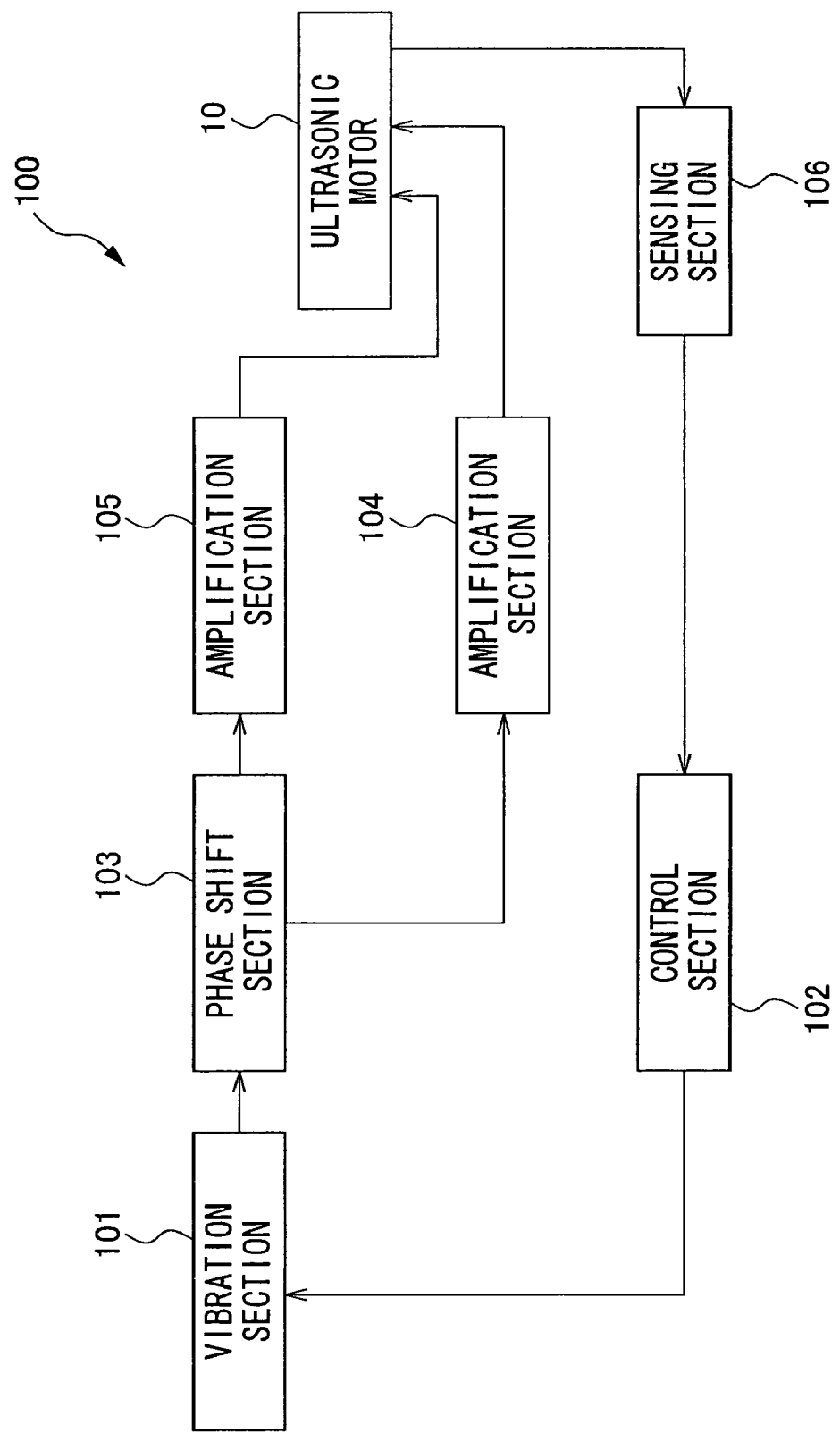
FIG. 3 is a block diagram describing a driving device of the ultrasonic motor 10 of the first embodiment.

FIG. 3 is a block diagram describing the driving device 100 of the ultrasonic motor 10 of the first embodiment.

The driving device 100 of the ultrasonic motor 10 includes a vibration section 101, a control section 102, a phase shift section 103, amplification sections 104 and 105, and a sensing section 106.

The vibration section 101 is a section that generates a driving signal of a required frequency in accordance with instructions from the control section 102

The phase shift section 103 is a section that divides the driving signal generated by the vibration section 101 into two driving signals which differ in phase by 90°.

The amplification sections 104 and 105 are sections that raise the voltages of the two driving signals which have been divided by the phase shift section 103 to respective required voltages. The driving signals from the amplification sections 104 and 105 are transmitted to the ultrasonic motor 10. The progressive waves are generated in the vibrator 11 by the application of these driving signals, and drive the moving element 15.

The sensing section 106 is constituted of an optical encoder, a magnetic encoder or the like, and is a section that senses a position and speed of the lens 7 that is driven by the driving of the moving element 15. In the present embodiment, the position and speed of the lens 7 are sensed by a position and speed of the cam tube 6 being sensed.

The control section 102 is a section that, on the basis of driving instructions from an unillustrated CPU provided in the camera body 2, controls the driving of the ultrasonic motor 10. The control section 102 receives sensing signals from the sensing section 106, and on the basis of values thereof, obtains position information and speed information, and controls the driving frequency of the driving signal generated by the vibration section 101 so as to position at a target position.

The driving device 100 of the ultrasonic motor 10 operates as follows.

First, a target position is transmitted to the control section 102. A driving signal is generated from the vibration section 101, and from this signal, two driving signals which differ in phase by 90° are generated by the phase shift section 103, and are amplified to the required voltages by the amplification sections 104 and 105.

The driving signals are applied to the piezoelectric body 13 of the ultrasonic motor 10, the piezoelectric body 13 is excited, and fourth-order bending vibrations are generated in the vibrating body 12 by this excitation. The piezoelectric body 13 is divided into the A phase and the B phase, and the driving signals are applied to the A phase and the B phase, respectively. The fourth-order bending vibration generated from the A phase and the fourth-order bending vibration generated from the B phase are offset by a positional phase of a ¼-wavelength, and the A phase driving signal and the B phase driving signal are offset by a 90° phase. Therefore, the two bending vibrations are combined to form four progressive waves.

Elliptical movements occur at the wave peaks of the progressive waves. Accordingly, the moving element 15 that is pressingly touched against the driving face of the vibrating body 12 is frictionally driven by these elliptical movements.

The sensing section 106, which is an optical encoder or the like, senses the position and speed of the cam tube 6 that is driven by the driving of the moving element 15, and transmits them to the control section 102 in the form of electrical pulses. On the basis of these signals, the control section 102 can obtain the current position and current speed of the lens 7, and the driving frequency generated by the vibration section 101 is controlled on the basis of this position information and speed information and the target position information.

The piezoelectric body 13 used in the present embodiment of the ultrasonic motor 10 will be described.

Figure 4A:
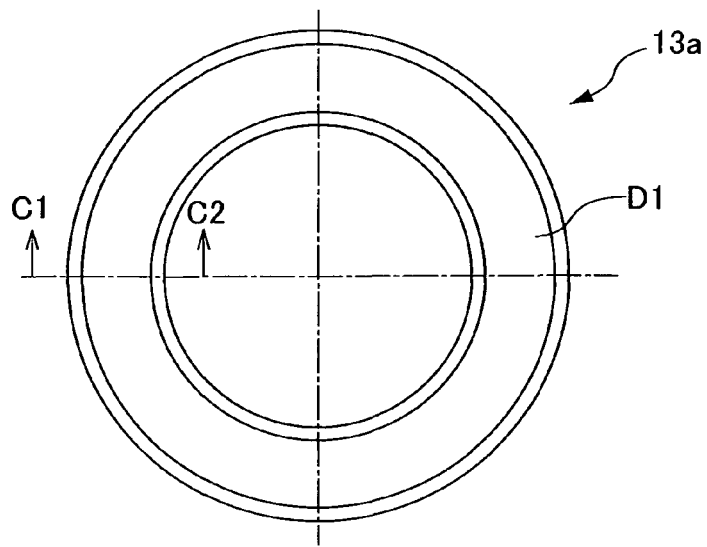
FIGS. 4A to 4C are views showing a piezoelectric body of the first embodiment.
Figure 4B:
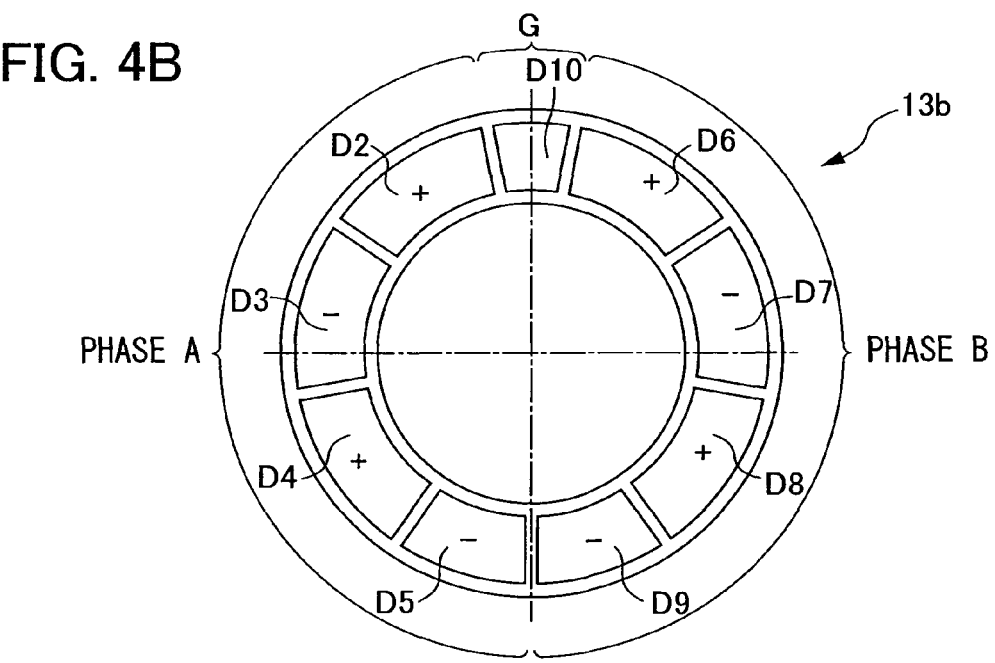
Figure 4C:
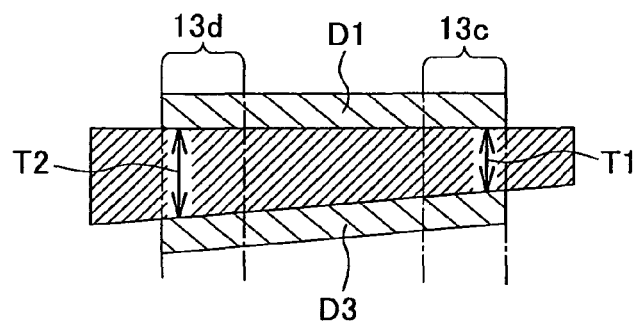

FIGS. 4A to 4C are views showing the piezoelectric body 13 of the first embodiment. FIG. 4A is a view in which a piezoelectric body side joining face 13a, which is joined to the joining face 12e of the vibrating body 12, is viewed from the vibrating body 12 side thereof. FIG. 4B is a view in which a face 13b (hereinafter referred to as the other face) of the piezoelectric body 13 at an opposite side thereof from the piezoelectric body side joining face 13a is viewed from the gear member 20 side thereof. FIG. 4C is a magnified view of a cross-section of the piezoelectric body 13 cut along the plane of arrows C1-C2 shown in FIG. 4A.

The piezoelectric body side joining face 13a is a face that is joined to the joining face 12e of the vibrating body 12 and is substantially parallel to the joining face 12e. A circumferentially continuous electrode portion D1 is formed at the piezoelectric body side joining face 13a.

The electrode portions D2 to D5 and D6 to D9, at which the electronic signals of the A phase and the B phase are inputted, and an electrode portion D10, which is a ground, are formed at the other face 13b of the piezoelectric body 13. The electrode portions D2 to D5 and D6 to D9 are arranged with polarities thereof alternating. The electrode portion D10 is formed between the electrode portion D2 and the electrode portion D6, so as to be between the A phase and the B phase.

The electrode portions D1 to D10 are formed by applying silver paste to the respective surfaces of the piezoelectric body side joining face 13a and the other face 13b, by screen printing.

Using the electrode portions, polarization processing is applied to the piezoelectric body 13.

The piezoelectric body side joining face 13a and the other face 13b of the present embodiment have configurations in which substrate surface of the piezoelectric body 13 are exposed at inner periphery ends and outer periphery ends thereof.

As shown in FIG. 2 and FIG. 4C, the piezoelectric body side joining face 13a is a substantially flat surface. The thickness of the piezoelectric body 13 (a dimension thereof in the direction orthogonal to the joining face 12e of the vibrating body 12 and the piezoelectric body side joining face 13a) is formed to be thinner at the inner periphery side and thicker at the outer periphery side. In the present embodiment, the other face 13b is formed as an inclined surface; as shown in FIG. 4C, the thickness of the piezoelectric body 13 gets thinner in a linear manner along the diametric direction, from the outer periphery side to the inner periphery side.

Hereinafter, as shown in FIG. 4C, in the diametric direction of the piezoelectric body 13, an inner periphery end portion vicinity of the region at which the electrode portions are formed is an inner periphery end portion 13c and an outer periphery end portion vicinity of the same is an outer periphery end portion 13d.

In general, if the piezoelectric constant of a piezoelectric body is dt, the thickness of the piezoelectric body is T, a voltage applied to the piezoelectric body by a driving signal is V, and an electric field produced in the piezoelectric body by the driving signal is E, then a piezoelectric strain amount S that is produced in the piezoelectric body by the driving signal is represented by the following expression.

$$S = dt \times E = dt \times (V/T) \quad \text{(Expression 1)}$$

If the piezoelectric constant dt, the voltage V applied by the driving signal and the thickness T of the piezoelectric body are substantially uniform regardless of diametric direction position in the piezoelectric body, then the piezoelectric strain amount S produced by the driving signal will be substantially constant for any diametric direction position of the piezoelectric body.

By contrast, in the present embodiment, although the piezoelectric constant dt and the voltage V applied to the piezoelectric body 13 by the driving signal are constant, a thickness T1 of the piezoelectric body 13 at an arbitrary point of the inner periphery end portion 13c of the piezoelectric body 13 is thinner than a thickness T2 of an arbitrary point of the outer periphery side end portion 13d. Therefore, according to the expression 1, an electric field E1 produced in the inner periphery end portion 13c by the driving signal is larger than an electric field E2 produced in the outer periphery end portion 13d, and a piezoelectric strain amount S1 produced in the inner periphery end portion 13c of the piezoelectric body 13 by the driving signal is larger than a piezoelectric strain amount S2 produced in the outer periphery end portion 13d.

Now, if a displacement is a and an arbitrary distance is L, the displacement a can be represented by the following expression.

$$a = S \times L \quad \text{(Expression 2)}$$

From expression 2, if the distance L is constant, then the vibration amplitude of a progressive wave, which is a displacement a, is proportional to the piezoelectric strain amount S.

As described above, the piezoelectric strain amount S1 produced in the inner periphery end portion 13c of the piezoelectric body 13 of the present embodiment is larger than the piezoelectric strain amount S2 produced in the outer periphery end portion 13d. Therefore, per unit of distance, a vibration amplitude of a progressive wave generated in a region of the driving face 12d that corresponds with the inner periphery end portion 13c can be made larger than a vibration amplitude of a progressive wave generated in a region of the driving face 12d that corresponds with the outer periphery end portion 13d.

If the thickness of a base portion of a vibrating body is made thinner at the inner periphery side in the diametric direction and the thickness of the base portion at the outer periphery side is made thicker, vibration characteristics such as vibration modes and the like differ between the inner periphery side and the outer periphery side of the vibrating body. In consequence, vibration characteristics of the progressive waves that are produced by driving signals at the inner periphery side of the driving face and the progressive waves that are produced at the outer periphery side are different, a moving element cannot be driven stably, and driving efficiency and the like deteriorate.

However, the thickness of the base portion 12b of the vibrating body 12 of the present embodiment is constant in the diametric direction, while the thickness of the piezoelectric body 13 is thicker at the outer periphery side and thinner at the inner periphery side. Therefore, a combined thickness of the base portion 12b of the vibrating body and the piezoelectric body 13 is thinner at the inner periphery side than the thickness of the same at the outer periphery side.

Accordingly, in the present embodiment, a difference in bending stiffness magnitudes between the inner periphery side and the outer periphery side of a portion including the base portion 12b and the piezoelectric body 13 may be made smaller, without characteristics such as vibration modes and the like of the vibrating body 12 being altered.

Because, as described above, the thickness T1 of the inner periphery end portion 13c of the piezoelectric body 13 is thinner than the thickness T2 of the outer periphery end portion 13d, the following effects are provided.

(1) The piezoelectric strain amount S1 produced in the inner periphery end portion 13c of the piezoelectric body 13 is larger than the piezoelectric strain amount S2 produced in the outer periphery end portion 13d.

(2) In regard to stiffnesses of the portion including piezoelectric body 13 and the base portion 12b of the vibrating body 12, a difference between the inner periphery side and the outer periphery side of the piezoelectric body 13 is smaller.

Because of these effects, a difference between the vibration amplitude magnitudes of the progressive waves produced at the driving face 12d at the inner periphery side of the vibrator 11 and the vibration amplitude magnitudes at the outer periphery side is smaller.

Therefore, according to the present embodiment, differences in vibration amplitude magnitudes of progressive waves with respect to the diametric direction of the driving face 12d may be made smaller, the moving element 15 can be driven stably, and driving performance and driving efficiency of the ultrasonic motor 10 may be improved.

Moreover, according to the present embodiment, cracking of the piezoelectric body which occurs when the piezoelectric body is joined to the vibrating body may be reduced.

Ordinarily, grain boundaries of a piezoelectric body change when polarization is carried out. Consequently, in a piezoelectric body with substantially uniform thickness as is conventional, stiffness with respect to the circumferential direction at the outer periphery side is weaker than the stiffness at the inner periphery side, and substrate surface is deformed to a shape such that the inner periphery side is recessed or protruding relative to the outer periphery side. When a piezoelectric body in which this deformation has occurred is joined to the joining face 12e of a vibrating body, which is a substantially flat surface, cracking may occur in the piezoelectric body at the time of joining.

In contrast, in the piezoelectric body 13 of the present embodiment, because the thickness of the outer periphery end portion 13d is greater than the thickness of the inner periphery end portion 13c, stiffness in the circumferential direction at the outer periphery side may be made greater. Therefore, according to the present embodiment, the deformation during polarization of the piezoelectric body as described above may be avoided, and cracking of the piezoelectric body in the joining process may be reduced.

Furthermore, according to the present embodiment, as described above, the difference between the inner periphery side and the outer periphery side in the vibration amplitudes of the progressive waves produced at the driving face 12d can be made smaller. Therefore, even if an ultrasonic motor has a large difference between the external diameter and internal diameter because of miniaturization, stable driving can be performed and excellent driving performance obtained. A particularly remarkable effect may be realized if the present embodiment is applied to, for example, an ultrasonic motor in which the external diameter of the vibrator 11 is not more than 15 mm and which utilizes progressive waves with a wave number of not more than 5.

Second Embodiment

An ultrasonic motor of the second embodiment has a configuration substantially the same as the ultrasonic motor 10 illustrated in the first embodiment, except in that the form of the piezoelectric body 53 is different. Accordingly, portions that perform the same functions as in the above-described first embodiment are assigned the same reference numerals in the present embodiment, and duplicative descriptions are omitted as appropriate.

Figure 5A:
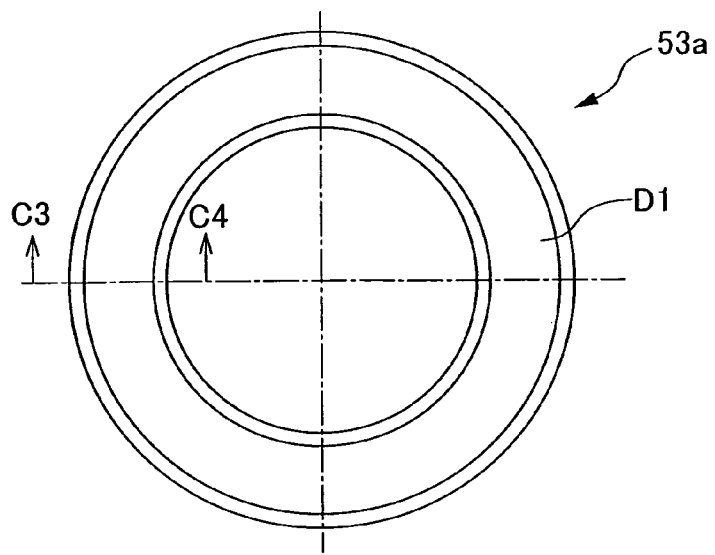
FIGS. 5A to 5C are views showing a piezoelectric body of a second embodiment.
Figure 5B:
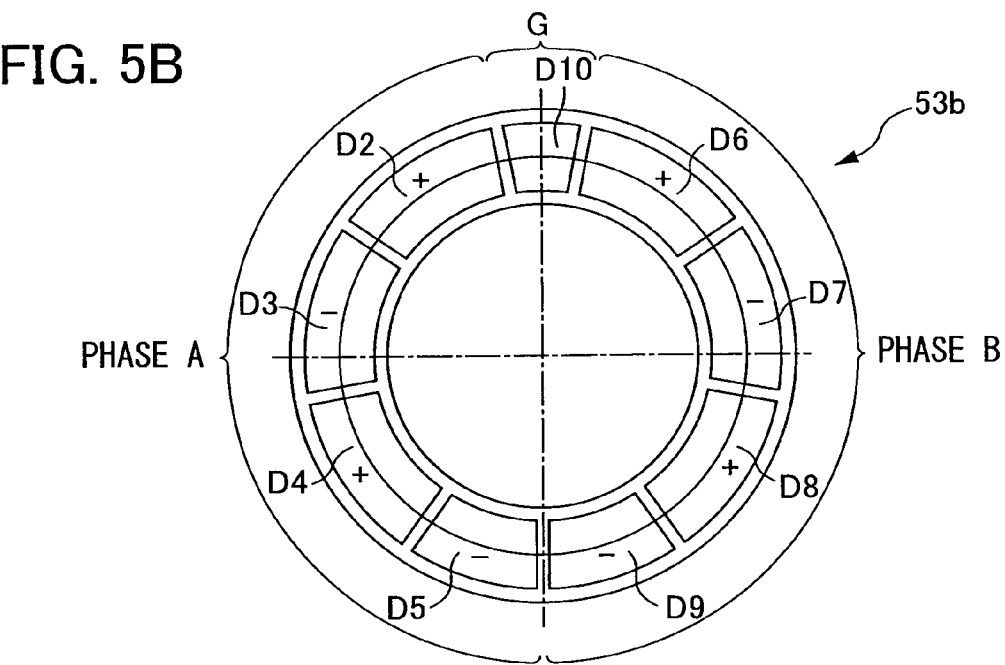
Figure 5C:
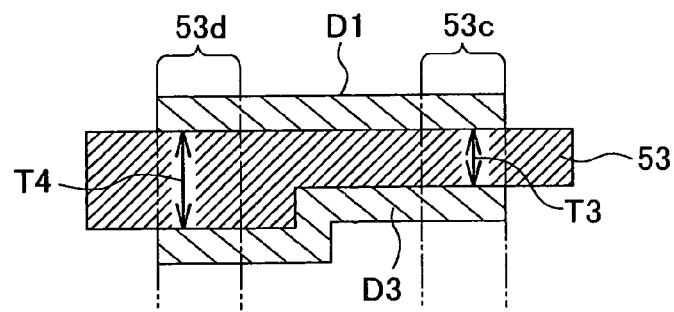

FIGS. 5A to 5C are views showing the piezoelectric body 53 of the second embodiment. FIG. 5A is a view in which a piezoelectric body side joining face 53a, which is joined to the joining face 12e of the vibrating body 12, is viewed from the vibrating body 12 side thereof. FIG. 5B is a view in which an other face 53b is viewed from the gear member 20 side thereof. FIG. 5C is a magnified view of a cross-section of the piezoelectric body 53 cut along the plane of arrows C3-C4 shown in FIG. 5A.

At the piezoelectric body 53, similarly to the piezoelectric body 13 illustrated in the first embodiment, the electrode portion D1 is formed at the piezoelectric body side joining face 53a, and the electrode portions D2 to D5 and D6 to D9, at which the signals of the A phase and the B phase are inputted, and the electrode portion D10, which is a ground, are formed at the other face 53b.

As shown in FIG. 5C, in the diametric direction of the piezoelectric body 53 of the present embodiment, an inner periphery end portion vicinity of the region at which the electrode portions are formed is an inner periphery end portion 53c and an outer periphery end portion vicinity of the same is an outer periphery end portion 53d.

The thickness of the piezoelectric body 53 of the second embodiment changes stepwise in the diametric direction, with a thickness T3 of the inner periphery end portion 53c being thinner than a thickness T4 of the outer periphery end portion 53d. In the present embodiment, the piezoelectric body side joining face 53a is a substantially flat surface while, as shown in FIG. 5C, the other face 53b is formed with a step such that the outer periphery side is thicker.

Because the thickness T3 of the inner periphery end portion 53c of the piezoelectric body 53 is thinner than the thickness T4 of the outer periphery end portion 53d, a piezoelectric strain amount S1 produced in the inner periphery end portion 53c by a driving signal can be made smaller than a piezoelectric strain amount S2 produced in the outer periphery end portion 53d by the driving signal, and a difference in vibration amplitude magnitudes in the diametric direction of the driving face 12d can be made smaller.

Moreover, the difference in bending stiffness magnitudes between the inner periphery side and the outer periphery side of the portion including the base portion 12b of the vibrating body 12 and the piezoelectric body 13 can be made smaller.

From the preceding descriptions, according to the present embodiment, the moving element 15 can be driven stably and improvements in driving efficiency and driving performance of the ultrasonic motor may be achieved.

Third Embodiment

An ultrasonic motor of the third embodiment has a configuration substantially the same as the ultrasonic motor 10 illustrated in the first embodiment, except in that the form of the piezoelectric body 63 is different. Accordingly, portions that perform the same functions as in the above-described first embodiment are assigned the same reference numerals in the present embodiment, and duplicative descriptions are omitted as appropriate.

Figure 6A:
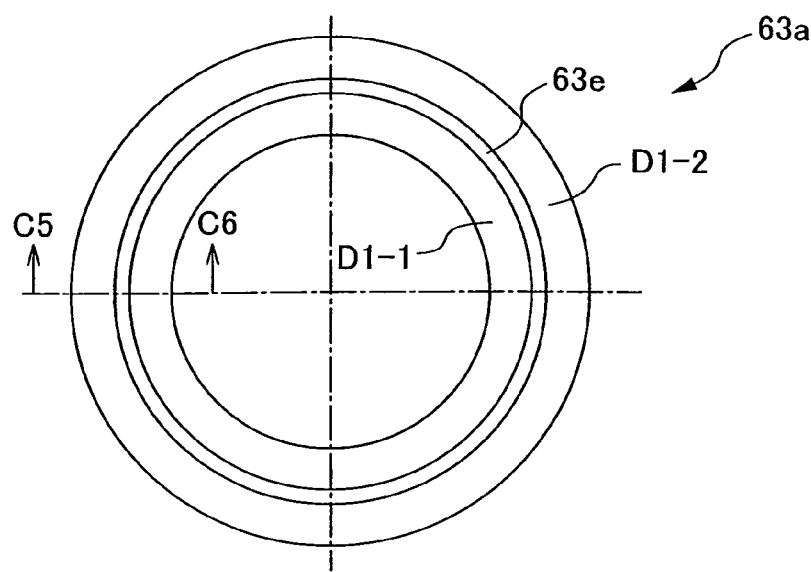
FIGS. 6A to 6C are views showing a piezoelectric body of a third embodiment.
Figure 6B:
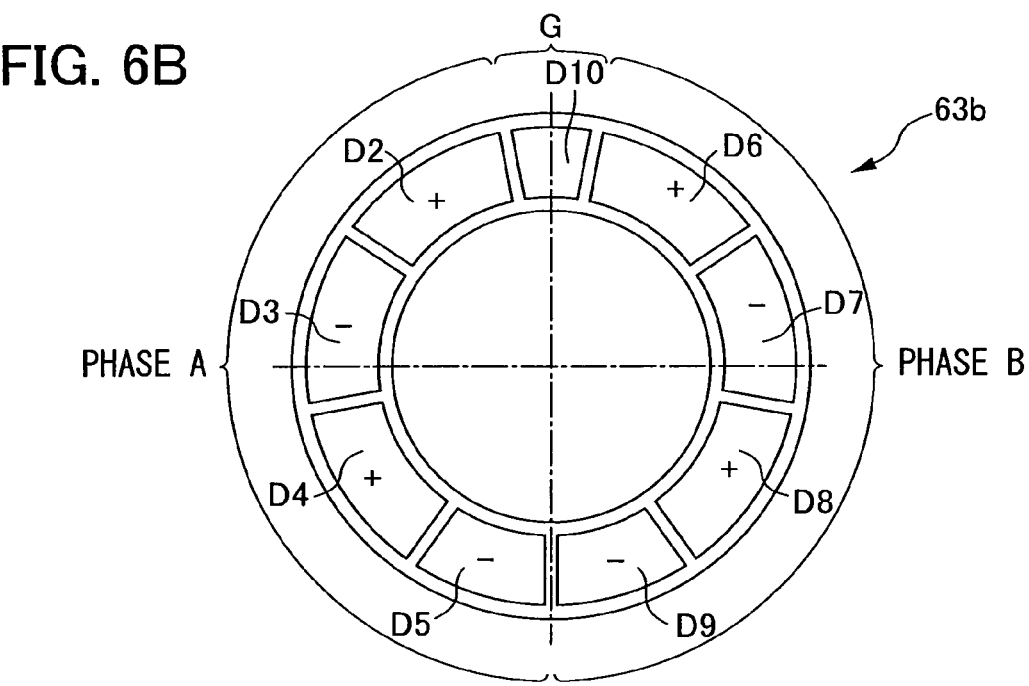
Figure 6C:
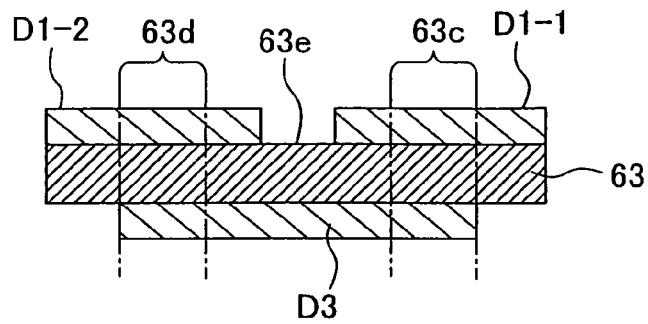

FIGS. 6A to 6C are views showing the piezoelectric body 63 of the third embodiment. FIG. 6A is a view in which a piezoelectric body side joining face 63a, which is joined to the joining face 12e of the vibrating body 12, is viewed from the vibrating body 12 side thereof. FIG. 6B is a view in which an other face 63b is viewed from the gear member 20 side thereof. FIG. 6C is a magnified view of a cross-section of the piezoelectric body 63 cut along the plane of arrows C5-C6 shown in FIG. 6A.

Substantially the same as at the other face 13b of the piezoelectric body 13 illustrated in the first embodiment, the electrode portions D2 to D5 and D6 to D9, at which the electronic signals of the A phase and the B phase are inputted, and the electrode portion D10, which is a ground, are formed at the other face 63b of the piezoelectric body 63 of the third embodiment.

However, at the piezoelectric body side joining face 63a, an electrode portion D1-1 is formed at the inner periphery side, and an electrode portion D1-2 is formed at the outer periphery side. A slit portion 63e is formed between the electrode portion D1-1 and the electrode portion D1-2 so as to expose the substrate surface of the piezoelectric body 63. In the present embodiment, as shown in FIG. 6A, the electrode portion D1-1 is formed up to the inner periphery edge of the piezoelectric body side joining face 63a, and the electrode portion D1-2 is formed up to the outer periphery edge of the piezoelectric body side joining face 63a.

The thickness of the piezoelectric body 63 is substantially uniform in the diametric direction and in the circumferential direction.

In the piezoelectric body 63 of the present embodiment, the piezoelectric constant dt1 of a region at which the electrode portion D1-1 is formed, including the inner periphery end portion 63c, is different from the piezoelectric constant dt2 of a region at which the electrode portion D1-2 is formed, including the outer periphery end portion 63d.

As mentioned earlier, a piezoelectric strain amount S that is produced in the piezoelectric body is represented by the following expression.

$$S = dt \times E = dt \times (V/T) \quad \text{(Expression 1)}$$

Here, dt is the piezoelectric constant, E is the electric field produced in the piezoelectric body by a driving signal, V is the voltage applied to the piezoelectric body by the driving signal, and T is the thickness of the piezoelectric body.

If the electromechanical coupling coefficient is K, the permittivity is $\epsilon$ and Young's modulus is Y, the piezoelectric constant dt is represented by the following expression.

$$dt = K \times (\epsilon/Y)^{1/2} \quad \text{(Expression 3)}$$

In general, the permittivity c is proportional to a polarization voltage that is applied during polarization.

In the present embodiment, when the piezoelectric body 63 is being polarized, a polarization voltage Vb1 that is applied to the electrode portion D1-1 at the inner periphery side is larger than a polarization voltage Vb2 that is applied to the electrode portion D1-2 at the outer periphery side. As a result, the permittivity $\epsilon 1$ of the region at which the electrode portion D1-1 is formed is larger than the permittivity $\epsilon 2$ of the region at which the electrode portion D1-2 is formed.

The electromechanical coupling coefficient K is constant for the inner periphery end portion 63c and the outer periphery end portion 63d. Therefore, from expression 3, the piezoelectric constant dt1 of the inner periphery end portion 63c is larger than the piezoelectric constant dt2 of the outer periphery end portion 63d.

Therefore, from expression 1, when a predetermined voltage is applied to the piezoelectric body 63 by a driving signal, a piezoelectric strain amount S1 that is produced in the inner periphery end portion 63c is larger than a piezoelectric strain amount S2 that is produced in the outer periphery end portion 63d. Hence, a difference in the diametric direction in the vibration amplitudes of the progressive waves that are produced at the driving face 12d of the vibrating body 12 may be made smaller.

According to the present embodiment, the piezoelectric body 63 is formed with a substantially uniform thickness. Therefore, previously existing molds may be used when molding the piezoelectric body 63.

The slit portion 63e of the present embodiment is provided with the objective of preventing conduction between the region of the piezoelectric body side joining face 63a that corresponds with the electrode portion D1-1 and the region that corresponds with the electrode portion D1-2 while polarization is being implemented. In the present embodiment, when the polarization is implemented, polarization is carried out separately for the electrode portion D1-1 and for the electrode portion D1-2. After the polarization has been implemented, a process that enables conduction between the electrode portion D1-1 and the electrode portion D1-2 is carried out.

Fourth Embodiment

An ultrasonic motor of the fourth embodiment has a configuration substantially the same as the ultrasonic motor 10 illustrated in the first embodiment, except in that the form of the piezoelectric body 73 is different. Accordingly, portions that perform the same functions as in the above-described first embodiment are assigned the same reference numerals in the present embodiment, and duplicative descriptions are omitted as appropriate.

Figure 7A:
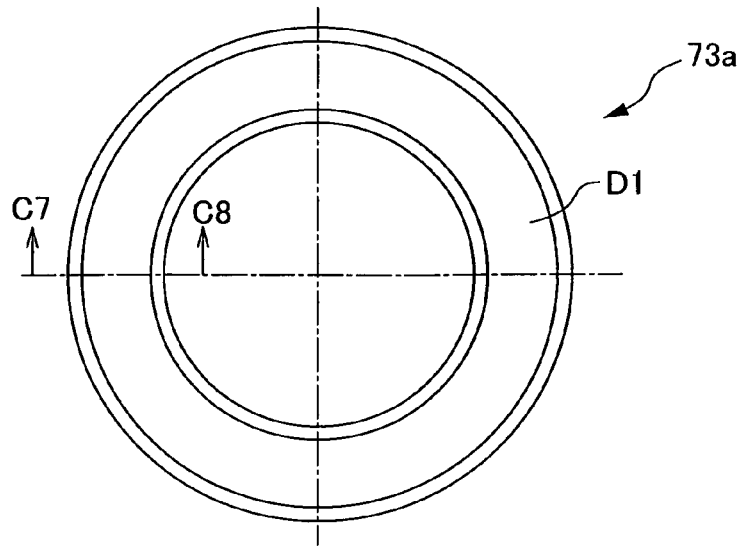
FIGS. 7A to 7C are views showing a piezoelectric body of a fourth embodiment.
Figure 7B:
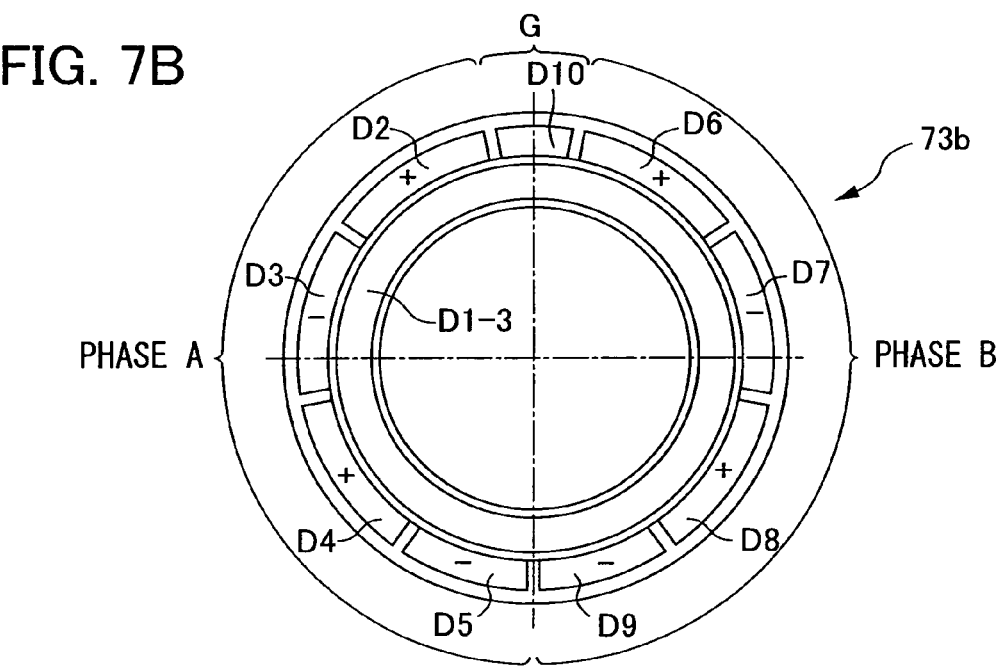
Figure 7C:
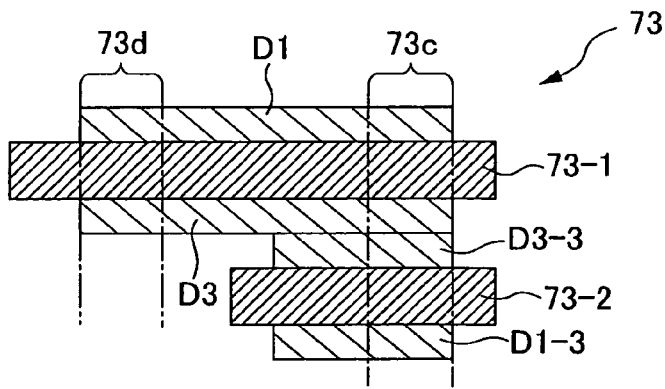

FIGS. 7A to 7C are views showing the piezoelectric body 73 of the fourth embodiment. FIG. 7A is a view in which a piezoelectric body side joining face 73a, which is joined to the joining face 12e of the vibrating body 12, is viewed from the vibrating body 12 side thereof. FIG. 7B is a view in which an other face 73b is viewed from the gear member 20 side thereof. FIG. 7C is a magnified view of a cross-section of the piezoelectric body 73 cut along the plane of arrows. C7-C8 shown in FIG. 7A.

The piezoelectric body 73 of the fourth embodiment has a configuration in which a first piezoelectric body 73-1 and a second piezoelectric body 73-2 are stacked.

The first piezoelectric body 73-1 has a form substantially the same as the piezoelectric body 13 of the first embodiment except in that the thickness is substantially uniform. The first piezoelectric body 73-1 is disposed at the vibrating body 12 side of the piezoelectric body 73, and includes the piezoelectric body side joining face 73a that is joined to the joining face 12e of the vibrating body 12. The electrode portion D1 is formed on the piezoelectric body side joining face 73a.

The electrode portions D2 to D10 are formed on the surface at the other face 73b side of the first piezoelectric body 73-1. In FIG. 7B, the inner periphery side of the first piezoelectric body 73-1 is stacked with the second piezoelectric body 73-2. Consequently, it is not possible to see the whole of the first piezoelectric body 73-1 in FIG. 7B.

The second piezoelectric body 73-2 is disposed at the other face 73b side of the piezoelectric body 73, and has an annular form with a substantially uniform thickness. The second piezoelectric body 73-2 has substantially the same inner diameter as the first piezoelectric body 73-1, but the outer diameter is smaller than that of the first piezoelectric body 73-1. The second piezoelectric body 73-2 is stacked on the face of the first piezoelectric body 73-1 at the other face 73b side thereof (the opposite side from the piezoelectric body side joining face 73a), in a state in which the central axes of the first piezoelectric body 73-1 and the second piezoelectric body 73-2 coincide.

At a region of the first piezoelectric body 73-1 side face of the second piezoelectric body 73-2 that corresponds with the electrode portions D2 to D10 of the first piezoelectric body 73-1, a similar, unillustrated electrode pattern is formed on the second piezoelectric body 73-2. For example, as shown in FIG. 7C, an electrode portion D3-3 with the same polarization as the electrode portion D3 of the first piezoelectric body 73-1 is formed at the region of the second piezoelectric body 73-2 that corresponds with the electrode portion D3.

The first piezoelectric body 73-1 and the second piezoelectric body 73-2 are stacked such that the electrode patterns match up, and are joined.

A circumferentially continuous electrode portion D1-3 is formed on the face of the second piezoelectric body 73-2 that is at the other face 73b side of the piezoelectric body 73. In the present embodiment, similarly to the electrode portion D1, the electrode portion D1-3 is formed, using silver paste, in a form such that substrate surface of the second piezoelectric body 73-2 is exposed at the outer periphery end and the inner periphery end thereof.

As described above, the inner periphery side of the piezoelectric body 73 of the present embodiment is formed as two layers (the first piezoelectric body 73-1 and the second piezoelectric body 73-2), and the outer periphery side is formed as one layer (the first piezoelectric body 73-1). In the piezoelectric body 73 of the present embodiment, as shown in FIG. 7C, an inner periphery end portion vicinity of the region at which the electrode portions are formed is an inner periphery end portion 73c, and an outer periphery end portion vicinity of the region at which the electrode portions are formed on both the first piezoelectric body 73-1 and the second piezoelectric body 73-2 is an outer periphery end portion 73d.

With this configuration, when a predetermined driving signal is applied to the piezoelectric body 73, the outer periphery side only produces a piezoelectric strain amount corresponding to a one-layer piezoelectric body, and the inner periphery side produces a piezoelectric strain amount corresponding to a two-layer piezoelectric body. Therefore, a piezoelectric strain amount S1 produced in the inner periphery end portion 73c of the piezoelectric body 73 by the driving signal is larger than a piezoelectric strain amount S2 produced in the outer periphery end portion 73d, and a difference between the inner periphery side and the outer periphery side in the vibration amplitudes of the progressive waves produced at the driving face 12d of the vibrating body 12 becomes smaller.

Therefore, according to the present embodiment, stable driving of the moving element 15 can be performed, and improvements in driving performance and driving efficiency of the ultrasonic motor may be achieved.

Moreover, the piezoelectric body 73 may be fabricated with ease simply by stacking the first piezoelectric body 73-1 and the second piezoelectric body 73-2.

Variant Examples

The above embodiments are not limiting; numerous modifications and alterations are possible.

(1) In the second embodiment, an example is illustrated in which the step formed in the other face 53b of the piezoelectric body 53 is a single step. However, this is not limiting. For example, there may be two or more steps. When the thickness of the piezoelectric body is altered stepwise in a plural number of steps, piezoelectric strain amounts produced in the piezoelectric body by driving signals may be altered in more steps in the diametric direction. Thus, the effect of reducing the difference in the diametric direction between the vibration amplitudes of the progressive waves produced at the driving face 12d of the vibrating body 12 may be enhanced.

(2) In the third embodiment, an example is illustrated in which, during polarization of the piezoelectric body 63, the polarization voltage applied to the region at which the electrode portion D1-1 is formed (the inner periphery side) is larger than the polarization voltage applied to the region at which the electrode portion D1-2 is formed (the outer periphery side).

However, this is not limiting. The piezoelectric body 63 may be divided into a plural number of regions in the diametric direction and the polarization performed by applying polarization voltages that decrease stepwise from the inner periphery side to the outer periphery side.

With this mode, the effect of reducing the difference in the diametric direction between the vibration amplitudes of the progressive waves produced at the driving face 12d of the vibrating body 12 may be enhanced. Such a case is a mode in which a plural number of the slit portion that is formed on the piezoelectric body side joining face 63a are formed between the regions with different polarization voltage magnitudes.

(3) In the third embodiment, an example is illustrated in which the polarization voltage applied during polarization of the piezoelectric body 63 is made different for the inner periphery side and the outer periphery side. However, this is not limiting. For example, the inner periphery side and the outer periphery side may be formed using materials with different piezoelectric constants dt.

(4) In the fourth embodiment, an example is illustrated in which the piezoelectric body 73 has a configuration in which the first piezoelectric body 73-1 and the second piezoelectric body 73-2 are stacked. However, this is not limiting. For example, three or more layers of piezoelectric bodies may be stacked. With such a configuration, the piezoelectric strain amounts produced in the piezoelectric body by a driving signal may be altered in more steps in the diametric direction. Thus, the effect of reducing the difference in the diametric direction between the vibration amplitudes of the progressive waves produced at the driving face 12d of the vibrating body 12 may be enhanced.

(5) In each of the embodiments, descriptions are given taking the ultrasonic motor in which the moving element 15 is rotatingly driven as an example. However, this is not limiting. Application is also possible to a linear-type vibration actuator in which a moving element is driven to describe an arc.

(6) In each of the embodiments, descriptions are given taking the ultrasonic motor in which the moving element 15 is rotatingly driven as an example. However, this is not limiting. For example, application is also possible to a vibration actuator that uses vibrations outside the ultrasonic range.

(7) In each of the embodiments, an example is illustrated in which the ultrasonic motor is used for driving a lens during focusing operations. However, this is not limiting. For example, it may be an ultrasonic motor that is used for driving a lens during zoom operations.

(8) In each of the embodiments, an example is illustrated in which the ultrasonic motor is used in a camera. However, this is not limiting. For example, it may be used in a driving section of a photocopier, a driving section of a steering wheel-tilting device or a headrest in a car, or the like.

The respective embodiments and variant examples may be suitably combined and used, but detailed descriptions are not given herein. The present invention is not to be limited by the embodiments described hereabove.

What is claimed is:

1. A vibration actuator comprising:
   an electromechanical conversion element that is excited by a driving signal;
   a vibrating body including a joining face, to which the electromechanical conversion element is joined, and a driving face, at which a vibration wave is produced by the excitation; and
   a relative motion member that is pressingly touched against the driving face, is driven by the vibration wave, and relatively moves with respect to the vibrating body, wherein
   at a first portion and a second portion of the electromechanical conversion element in a direction that is parallel to the joining face and orthogonal to a direction of the relative movement of the vibrating body and the relative motion member, thickness in a direction orthogonal to the joining face differs between the first portion and the second portion.

2. The vibration actuator according to claim 1, wherein
the electromechanical conversion element and the vibrating body are in substantially annular forms,
the first portion is an inner periphery portion of the electromechanical conversion element, and
the second portion is an outer periphery portion of the electromechanical conversion element.

3. The vibration actuator according to claim 2, wherein
the thickness of the inner periphery portion in the direction orthogonal to the joining face is thinner than the thickness of the outer periphery portion in the direction orthogonal to the joining face.

4. The vibration actuator according to claim 1, wherein
the thickness of the electromechanical conversion element in the direction orthogonal to the joining face alters stepwise along the direction that is parallel to the joining face and orthogonal to the direction of relative movement of the vibrating body and the relative motion member.

5. The vibration actuator according to claim 1, wherein
the thickness of the electromechanical conversion element in the direction orthogonal to the joining face alters stepwise along the direction that is parallel to the joining face and orthogonal to the direction of relative movement of the vibrating body and the relative motion member, due to the electromechanical conversion element being formed with a plurality of layers being stacked.

6. The vibration actuator according to claim 1, wherein
a magnitude of an electric field produced at the first portion by the driving signal differs from a magnitude of an electric field produced at the second portion by the driving signal.

7. A lens barrel comprising the vibration actuator according to claim 1.

8. A camera comprising the vibration actuator according to claim 1.

* * * * *